US011936221B2

(12) United States Patent
Geiger et al.

(10) Patent No.: US 11,936,221 B2
(45) Date of Patent: Mar. 19, 2024

(54) BATTERY SYSTEM, LOCAL ELECTRICAL GRID AND DISCONNECTOR

(71) Applicant: Sonnen GmbH, Wildpoldsried (DE)

(72) Inventors: Michael Geiger, Memmingerberg (DE); Wolfram Hennemann, Memmingen (DE)

(73) Assignee: Sonnen GmbH, Wildpoldsried (DE)

( * ) Notice: Subject to any disclaimer, the term of this patent is extended or adjusted under 35 U.S.C. 154(b) by 993 days.

(21) Appl. No.: 16/757,593

(22) PCT Filed: Oct. 16, 2018

(86) PCT No.: PCT/DE2018/100852
§ 371 (c)(1),
(2) Date: Apr. 20, 2020

(87) PCT Pub. No.: WO2019/076405
PCT Pub. Date: Apr. 25, 2019

(65) Prior Publication Data
US 2020/0266638 A1 Aug. 20, 2020

(30) Foreign Application Priority Data

Oct. 20, 2017 (DE) .......................... 102017124567.7

(51) Int. Cl.
*H02J 7/00* (2006.01)
*H01H 50/04* (2006.01)
*H01H 50/44* (2006.01)

(52) U.S. Cl.
CPC .......... *H02J 7/0031* (2013.01); *H01H 50/04* (2013.01); *H01H 50/44* (2013.01); *H01H 2050/049* (2013.01)

(58) Field of Classification Search
USPC ....................................................... 320/127
See application file for complete search history.

(56) References Cited

U.S. PATENT DOCUMENTS 2,141,624 A * 12/1938 Smith ...................... H02J 7/14
322/17
5,504,414 A * 4/1996 Kinoshita ............. B60L 15/007
320/109

(Continued)

FOREIGN PATENT DOCUMENTS

CN 105684254 A 6/2016
DE 19816878 A1 10/1999

(Continued)

OTHER PUBLICATIONS

International Search Report for PCT/DE2018/100852 dated Jan. 29, 2019 (PCT/ISA/210).

*Primary Examiner* — Samuel Berhanu
(74) *Attorney, Agent, or Firm* — Sughrue Mion, PLLC

(57) ABSTRACT

The invention relates to a battery system, particularly for using in a local electrical grid, comprising: at least one battery module (1); an output terminal (2) which is electrically connected to the battery module (1) and used to charge and/or discharge the battery module (1) from and/or into the local electrical grid; a disconnector (3) which is arranged between the battery module (1) and at least one pole (21, 22) of the output terminal (2) and is designed to break the electrical connection between the battery module (1) and the at least one pole (21, 22) of the output terminal (2), when open; and a first signal circuit (41) which is designed to generate the triggering of the disconnector (3) in the event of a faulty state detected by the battery module (1) in such a way as to interrupt the electrical connection between the battery module (1) and the at least one pole (21, 22) of the output terminal (2). The invention also relates to a local electrical grid comprising a battery system and an inverter connected to the output terminal (2), and a multipolar disconnector (3) comprising a first switch (301) and at least one second switch (302) and/or a third switch (303) for (Continued)

disconnecting a battery module (1) from at least one pole (21, 22) of an output terminal (2), as well as at least one first holding coil (31) and a second holding coil (32) which are designed to hold the switches (301, 302, 303) closed only when the first holding coil (31) and the second holding coil (32) are energised.

13 Claims, 3 Drawing Sheets

(56) References Cited

U.S. PATENT DOCUMENTS

| | | | |
|---|---|---|---|
| 6,559,744 | B1 | 5/2003 | Kirsch |
| 6,661,320 | B1 | 12/2003 | Fausch |
| 9,941,712 | B2 | 4/2018 | Kaita et al. |
| 2012/0105015 | A1* | 5/2012 | Hermann .............. H02J 7/0031 |
| | | | 320/164 |
| 2015/0229143 | A1 | 8/2015 | Kaita et al. |
| 2016/0099591 | A1 | 4/2016 | Lee et al. |

FOREIGN PATENT DOCUMENTS

| | | |
|---|---|---|
| DE | 102014220033 A1 | 4/2016 |
| DE | 102015220820 A1 | 4/2017 |
| EP | 1120806 A1 | 8/2001 |
| JP | 2014-110683 A | 6/2014 |
| JP | 2015-033234 A | 2/2015 |
| KR | 10-2009-0125533 A | 12/2009 |

* cited by examiner

BATTERY SYSTEM, LOCAL ELECTRICAL GRID AND DISCONNECTOR

CROSS REFERENCE TO RELATED APPLICATIONS

This application is a National Stage of International Application No. PCT/DE2018/100852 filed Oct. 16, 2018, claiming priority based on German Patent Application No. 10 2017 124 567.7 filed Oct. 20, 2017, the entire contents of each of which are herein incorporated by reference in their entireties.

BACKGROUND

The invention relates to a battery system, a local electrical grid and a disconnector.

In particular, the invention relates to a battery system for use in a local electrical grid, the local electrical grid and a disconnector for use in the battery system. The battery system comprises at least one battery module composed of a plurality of interconnected batteries or electrical secondary cells preferably having a total storage capacity of more than two kWh. The individual batteries are in turn constructed from a plurality of secondary cells. The secondary cells can also be coupled electrical secondary cells that are structurally separate from one another.

The batteries and the battery module formed from electrically coupled batteries can thus be charged and discharged again if the battery module is connected to a charging and discharging device in the form of the local electrical grid. On account of this property, with the aid of such a battery system, the electrical energy from local DC or AC sources, for example, that is not required for immediate consumption can be stored for demand arising later in time.

However, such a battery system must be functionally safe, in other words, there must be a possibility of disconnecting the battery module from a charging and discharging device to it if there is a safety-critical situation such as e.g. overvoltage, overtemperature, overcharge or the like. At least in Germany, this disconnection will be obligatory and need to be certified in the future.

From prior art not substantiated by a documentary reference, it is known to realize functional safety for such battery systems with bus connections by way of functionally reliable bus communication and/or passive components such as a high-current relay, for example. However, this is generally expensive, complicated and laborious to certify.

DE102015220820A1 furthermore discloses a voltage converter having a DC voltage terminal, which is able to be coupled to a DC voltage source. An electrical switching element can be arranged between the DC voltage terminal and the DC voltage source and is designed to interrupt an electrical connection between the DC voltage terminal and the DC voltage source. The electrical switching element is configured as a battery circuit breaker or an overcurrent protection device.

However, there is a need for functional safety for a battery system of the type mentioned above which is cost-effective and simple to realize and to certify.

SUMMARY

Therefore, it is an object of the invention to provide a battery system, a local electrical system and a disconnector which are cost-effective and simple to realize.

The invention relates to a battery system, in particular for use in a local electrical grid, comprising:
at least one battery module;
an output terminal electrically connected to the battery module and serving for charging and/or discharging the battery module from and/or into the local electrical grid;
a disconnector arranged between the battery module and at least one pole of the output terminal and configured to, in an open state, disconnect the electrical connection between the battery module and the at least one pole of the output terminal;
a first signal circuit configured to, in the event of a fault state identified by the battery module, bring about triggering of the disconnector in such a way as to interrupt the electrical connection between the battery module and the at least one pole of the output terminal.

The battery system is of modular construction. A controller in the form of the first signal circuit and an output terminal for charging and/or discharging the battery module from and/or into the local electrical grid and also a disconnecting unit in the form of the disconnector for disconnecting the output terminal from the battery module are present. As a result, the battery system is cost-effective and simple to realize. Moreover, the functional safety of the battery system is ensured. Moreover, it is possible exclusively to use hardware as a basis for realizing functional safety, with the result that for functional safety at any rate there is no compulsion to rely exclusively on software.

The number of battery modules is at least one. In other words, the battery system can comprise one battery module or a plurality of battery modules. If the battery system contains a plurality of battery modules, the battery modules are connected to one another preferably in each case via a plug, for example, for bus communication. The plug is preferably configured for bus communication in the sense of a convenience function (i.e. not directed toward safety), voltage supply of the battery modules and for forwarding signals to the first signal circuit. The plug is preferably multi-pole and an RJ45 plug, for example. For the plug, each battery module preferably has two sockets, one for the input to a further battery module and one for the output to yet another battery module or for connection to the battery system controller with its first signal circuit. Irrespective of how many battery modules the battery system contains, functional safety is ensured by means of the first signal circuit. The connection via the plug makes it possible to ensure all communication in a manner directed toward safety and in a manner directed toward convenience.

Each battery module can identify a fault state and thus report a safety-critical situation as a fault state to the first signal circuit, which in turn brings about triggering of the disconnector in such a way as to interrupt the electrical connection between the battery module and the at least one pole of the output terminal. Therefore, the safety device in the form of the first signal circuit is always functional, regardless of how many battery modules are contained in the battery system.

The output terminal for charging and/or discharging the battery module from and/or into the local electrical grid is preferably configured to be connectable to an inverter.

In one preferred embodiment, the first signal circuit comprises a first fault relay, which is controlled by the battery module and which, in the event of the fault state identified by the battery module, is opened in order thereby to open the first signal circuit. A relay is advantageous vis a vis other electrical components because it has a relatively low contact transition resistance in the milliohms range, a relatively high making capacity or high overload capability, does not require cooling and is relatively robust. The battery system is proof against cable breaking.

In the embodiment just explained, the first fault relay can be integrated in the first circuit, in particular, such that its opening brings about an immediate interruption of the first circuit. As an alternative to this embodiment, the first fault relay can be configured and/or arranged in such a way that it is closed in the event of the fault state identified by the battery module, in order thereby to bring the first signal circuit to a predefined potential, for example to a ground of the device. In particular, the first fault relay can be arranged in a pull-down configuration in order, when it closes, to connect the first circuit to the predefined potential, in particular to ground. In order to realize this, a first pull-up resistor connected to the first fault relay is preferably provided, which biases the potential of the first circuit to an operating potential.

Preferably, the battery system furthermore comprises a second signal circuit configured to, in the event of a fault state identified by the battery module, bring about triggering of the disconnector in such a way that the electrical connection between the battery module and the at least one pole of the output terminal is interrupted. On account of this redundancy, each battery module can cause the connection to the output terminal to be interrupted by two independent signal circuits. Safety is increased as a result.

In one preferred embodiment, the second signal circuit comprises a second fault relay, which is controlled by the battery module and which, in the event of the fault state identified by the battery module is opened in order thereby to open the second signal circuit. The battery module thus controls the first fault relay and the second fault relay. Here, too, alternatively the second fault relay can be configured and/or arranged in such a way that it is closed in the event of the fault state identified by the battery module in order thereby to bring the second signal circuit to a predefined potential, for example to a ground of the device. In particular, the second fault relay can be arranged in a pull-down configuration in order, when it closes, to connect the second circuit to the predefined potential, in particular to ground. In order to realize this, a second pull-up resistor connected to the second fault relay is preferably provided, which biases the second circuit to an operating potential.

Preferably, one or a plurality of further battery modules are provided, wherein the first signal circuit comprises one or a plurality of further first fault relays controlled by the battery module and/or wherein the second signal circuit comprises one or a plurality of further second fault relays controlled by the battery module. Preferably, each battery module is assigned respectively a first fault relay and respectively a second fault relay. The first fault relays of the plurality or all of the battery modules are preferably connected in series with one another. This preferably also applies to the second fault relays. Consequently, the first circuit and the second circuit are each closed per se if no battery module identifies a fault state.

Preferably each first and second fault relay is configured as "normally open", i.e. what is involved is a make contact. The make contact is configured to make a contact when it is actuated or driven, and is also referred to as a normally open contact because it establishes a contact when it is actuated. This has the advantage that the fault relay(s) of a battery and thus the associated circuits are opened even if the battery fails completely and cannot emit a fault signal. In this case, non-driving of the fault relay is considered to be a fault signal.

If one or a plurality of further battery modules are provided, such that correspondingly a plurality of first fault relays and/or a plurality of second fault relays are provided, then one of the first fault relays in accordance with an embodiment explained first above, in the event of the fault state identified by the associated battery module, can be opened in order thereby to open the first signal circuit, while another of the first fault relays in accordance with an embodiment explained afterward is closed in order thereby to bring the first signal circuit to a predefined potential. The same can correspondingly apply to the plurality of second fault relays, insofar as they are present.

In one preferred embodiment, the disconnector comprises a first holding coil, which is supplied with current by the first signal circuit, and/or comprises a second holding coil, which is supplied with current by the second signal circuit, wherein the first holding coil and/or the second holding coil are/is configured to hold the disconnector in a closed state. The disconnector is configured to disconnect the battery module or the battery modules automatically from the output terminal in the event of interruption of the current through the first and/or second holding coil. In particular, a safe state corresponding to certification specifications IEC 62619, VDE-AR-E2510-50:2017-05 and UL 1973/9540 can thus be realized.

In one preferred embodiment, the battery system comprises the first signal circuit and the second signal circuit and the disconnector comprising the first holding coil and the second holding coil. The first holding coil is supplied with current by the first signal circuit and the second holding coil is supplied with current by the second signal circuit, wherein they are configured to hold the disconnector in a closed state when current flows through them.

In one variant of the above embodiment, the battery system comprises the first signal circuit and the second signal circuit and the disconnector comprising the first holding coil and the second holding coil and furthermore a first and a second relay. The first relay is supplied with current by the first signal circuit, and the second relay is supplied with current by the second signal circuit. Furthermore, the first relay switches a first auxiliary circuit, in which the first holding coil is situated, and the second relay switches a second auxiliary circuit, in which the second holding coil is situated. As long as current flows through the first holding coil and the second holding coil, the disconnector is held in the closed state. The first holding coil and the second holding coil are thus supplied with current indirectly by the first signal circuit and the second signal circuit, respectively.

Alternatively, in the two embodiments described above, the disconnector can be configured with just one holding coil, wherein either the current flowing in the first or second signal circuit flows through the holding coil or alternatively the current flowing in the first or second signal circuit drives a relay that closes an auxiliary circuit, which passes through the holding coil.

Preferably, the disconnector is configured at least in two-pole fashion with a first switch and a second switch in such a way as, in an open state, to disconnect the electrical connection between the battery module and two poles of the output terminal. Preferably, the disconnector is configured in three-pole fashion with a third switch, which, in a closed state of the disconnector, ensures a current supply for the first signal circuit and/or the second signal circuit and, in the opened state of the disconnector, interrupts the current supply for the first signal circuit and/or the second signal circuit. Said third switch constitutes additional safety.

In one preferred embodiment, the disconnector is configured in single-pole fashion with a first switch or in multi-pole fashion with at least a second switch and/or a third switch, wherein each switch has an electrical fuse. As a result, the disconnector also has an overcurrent fuse function, which in turn obviates an additional overcurrent fuse.

Preferably, the disconnector is configured in single-pole fashion with a first switch or in multi-pole fashion with at least a second switch and/or a third switch, wherein all switches are mechanically coupled to one another in such a way that they can change between the open state and a closed state of the disconnector only jointly. If the first holding coil or, if provided, the second holding coil is not energized, then all switches of the disconnector jointly attain the open state.

In one preferred embodiment, the disconnector comprises an actuation element, by means of which the disconnector is able to be transferred manually from the open state to the closed state. As a result, the disconnector is switchable on and off manually.

Preferably, the first circuit and/or the second circuit are/is fed from the battery module. By way of example, the battery system comprises a DC/DC converter connected between the battery module and the first and/or second signal circuit. If auxiliary circuits are provided, then they, too, are preferably fed from the battery module.

The battery system is preferably a battery system which is suitable for temporarily supplying an electrical building energy supply network with electrical energy. On account of the storage capacity of the batteries or secondary cells of the battery module or battery modules, with the aid of the battery system, the electrical energy from local DC or AC sources, for example, that is not required for immediate consumption can be stored for demand arising later in time. Local DC and AC sources, i.e. ones established in relatively close proximity to the building network, are for example photovoltaic installations, wind power installations or alternatively combined heat and power plants. These battery systems are used in particular for supplying electrical building energy supply networks of private households and businesses with electrical energy.

The invention furthermore relates to a local electrical grid comprising a battery system according to one or more of the embodiments described above and an inverter connected to the output terminal. Besides a terminal for connection to the output terminal, the inverter preferably furthermore comprises a terminal for connection to the building energy supply network and/or the local DC or AC source of, in particular, a photovoltaic installation. The inverter converts electricity generated by solar modules of a photovoltaic installation, for example, and feeds it into the battery system and/or into the building energy supply network. At the same time, it can be configured to monitor and/or to control the battery system.

Furthermore, the invention relates to a multi-pole disconnector comprising a first switch and at least a second switch and/or a third switch for disconnecting a battery module from at least one pole of an output terminal, comprising at least a first holding coil and a second holding coil, which are configured to hold the switches in a closed state only if the first holding coil and the second holding coil are energized.

Preferably, the multi-pole disconnector furthermore comprises an actuation element, by means of which the switches are able jointly to be transferred manually from the open state to the closed state. Moreover, preferred embodiments described in relation to the battery system and relating to the disconnector contained in the battery system are applicable, mutatis mutandis, to the disconnector.

BRIEF DESCRIPTION OF THE DRAWINGS

Further properties and advantages of the invention are elucidated in association with the exemplary embodiments shown in the figures and described by way of example below. In the figures, schematically.

DETAILED DESCRIPTION

Figure 1:
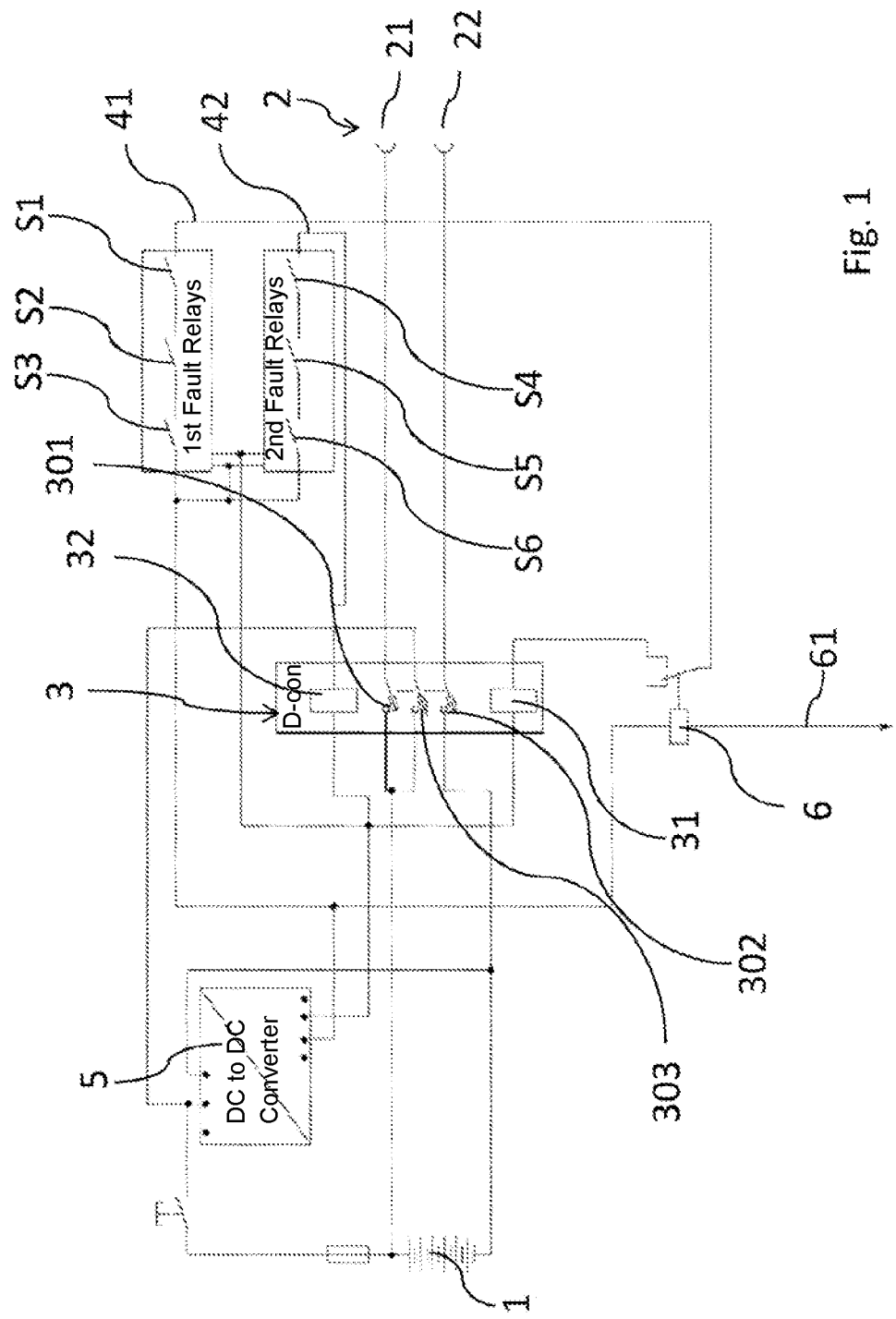
FIG. 1 shows a circuit diagram of a battery system in accordance with a first embodiment.

FIG. 1 shows a circuit diagram of a battery system in accordance with a first embodiment. The battery system comprises, purely by way of example, three battery modules 1, which here are shown merely schematically and not individually. Furthermore, the battery system comprises an output terminal 2 electrically connected to the battery modules 1 and serving for charging and/or discharging the battery modules 1 from and/or into the local electrical grid (not shown). The output terminal is configured to be connected to an inverter (not shown).

The output terminal 2 comprises a pole 21 and a pole 22. A disconnector 3 is arranged between the battery modules 1 and the poles 21, 22. The disconnector 3 is configured to, in an open state, disconnect the electrical connection between the battery modules 1 and the poles 21, 22. Furthermore, the battery system comprises a first signal circuit 41 configured to, in the event of a fault state identified by the battery module 1, bring about triggering of the disconnector 3 in such a way as to interrupt the electrical connection between the battery module 1 and the poles 21, 22. Furthermore, the battery system contains a second signal circuit 42 configured to, in the event of a fault state, identified by the battery module 1, bring about triggering of the disconnector 3 in such a way as to interrupt the electrical connection between the battery module 1 and the poles 21, 22.

The disconnector 3 comprises a first holding coil 31, which is supplied with current by the first signal circuit 41, and a second holding coil 32, which is supplied with current by the second signal circuit 42. The holding coils 31, 32 are configured to hold the disconnector 3 in a closed state if they are both simultaneously supplied with current.

The disconnector 3 is furthermore configured in three-pole fashion. It comprises a first switch 301 and a second switch 302, which are configured to, in an open state, disconnect the electrical connection between the battery modules 1 and the poles 21, 22. The first switch 301 is connected to the pole 21, while the second switch 302 is connected to the pole 22. A third switch 303 of the disconnector 3 is configured to, in a closed state of the disconnector 3, ensure a current supply for the first signal circuit 41 and the second signal circuit 42 and, in the opened state of the disconnector 3, to interrupt the current supply for the first signal circuit 41 and the second signal circuit 42. The disconnector 3 is held in the closed state only when current flows both through the first holding coil 31 and through the second holding coil 32.

The first circuit 41 comprises three first fault relays S1, S2, S3, which are respectively assigned to one of the three battery modules 1. They are connected in series. Equally, the second circuit 42 comprises three second fault relays S4, S5, S6, which are respectively assigned to a battery module of the three battery modules 1. They are also connected in series. In other words, by means of two independent fault relays, namely a first fault relay S1, S2, S3 and a second fault relay S4, S5, S6, each battery module can trigger switching of the disconnector 3 from the closed state to an open state if it identifies a fault state.

The first circuit 41 and the second circuit 42 are fed from the battery modules 1. For this purpose, the battery system comprises a DC/DC converter 5 connected between the battery modules 1 and the first circuit 41 and the second signal circuit 42. For the case where the voltage ranges of the battery modules 1 and of the holding coils 31,32 correspond, the DC/DC converter 5 would be dispensable.

Figure 2:
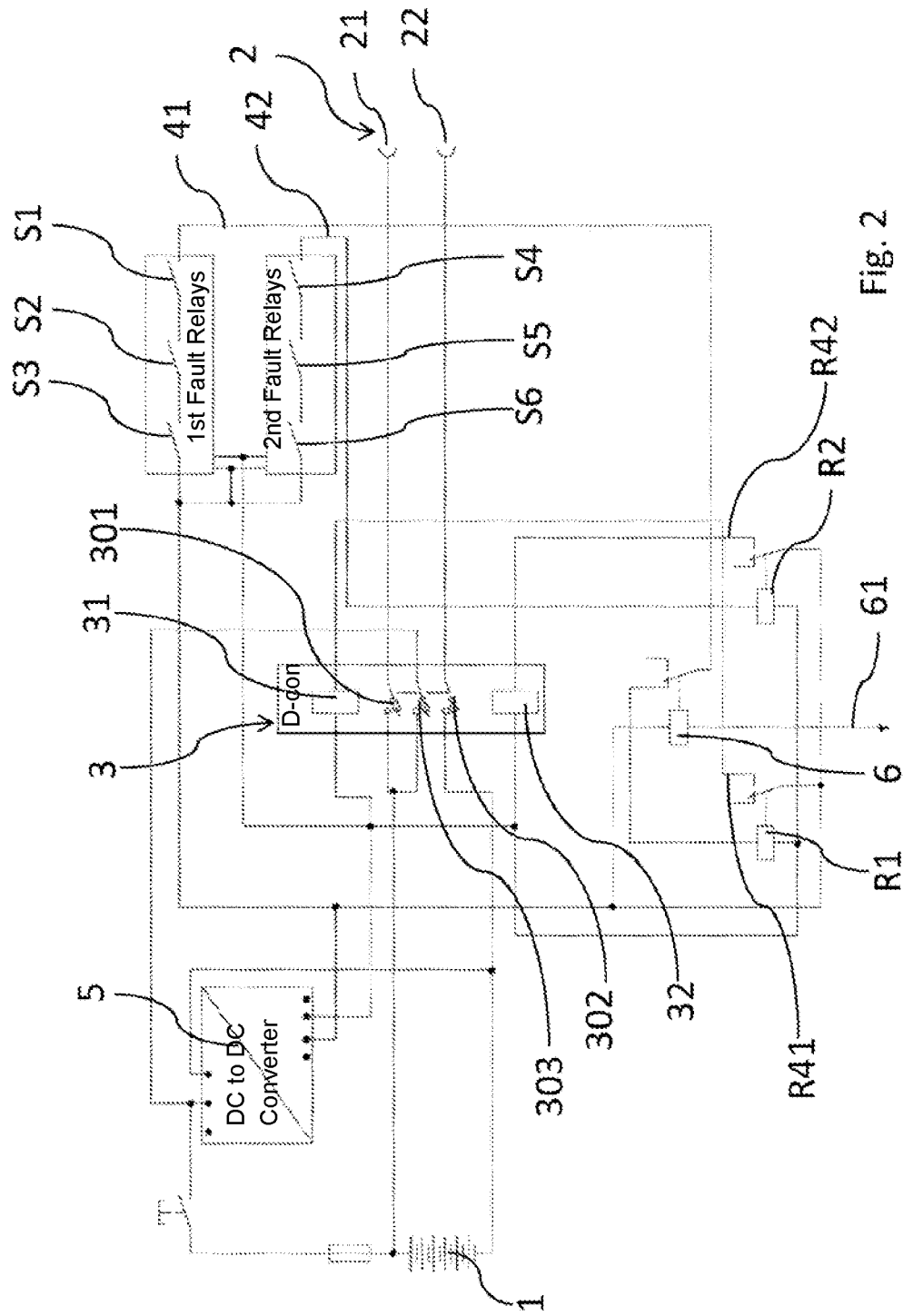
FIG. 2 shows a circuit diagram of a battery system in accordance with a second embodiment.

FIG. 2 shows a circuit diagram of a battery system in accordance with a second embodiment. The battery system shown in FIG. 2 comprises the same components as the battery system shown in FIG. 1, but furthermore a first relay R1 and a second relay R2. The components described with reference to FIG. 1 and their component of the battery system shown in FIG. 2 are configured in the same way and function in the same way as in the battery system described in FIG. 1 with the difference that the first relay R1 is supplied with current by the first signal circuit 41 and the second relay R2 is supplied with current by the second signal circuit 42. Unlike in the embodiment shown in FIG. 1, the first holding coil 31 is not part of the first signal circuit 41, rather the first relay R1 is part thereof instead. Correspondingly, the second holding coil 32 is not part of the second signal circuit 42, rather the second relay R2 is part thereof.

The first relay R1 switches a first auxiliary circuit R41, in which the first holding coil 31 is situated, and the second relay R2 switches a second auxiliary circuit R42, in which the second holding coil 32 is situated. The first holding coil 31 and the second holding coil 32 are thus supplied with current indirectly by the first signal circuit 41 and the second signal circuit 42, respectively.

Both in the first battery system in accordance with FIG. 1 and in the second battery system in accordance with FIG. 2, a control relay 6 is additionally provided, which can switch off the current flow through the first holding coil 31 independently of the other switching elements. For this purpose, the control relay 6 receives a corresponding signal via a control terminal 61.

Figure 3:
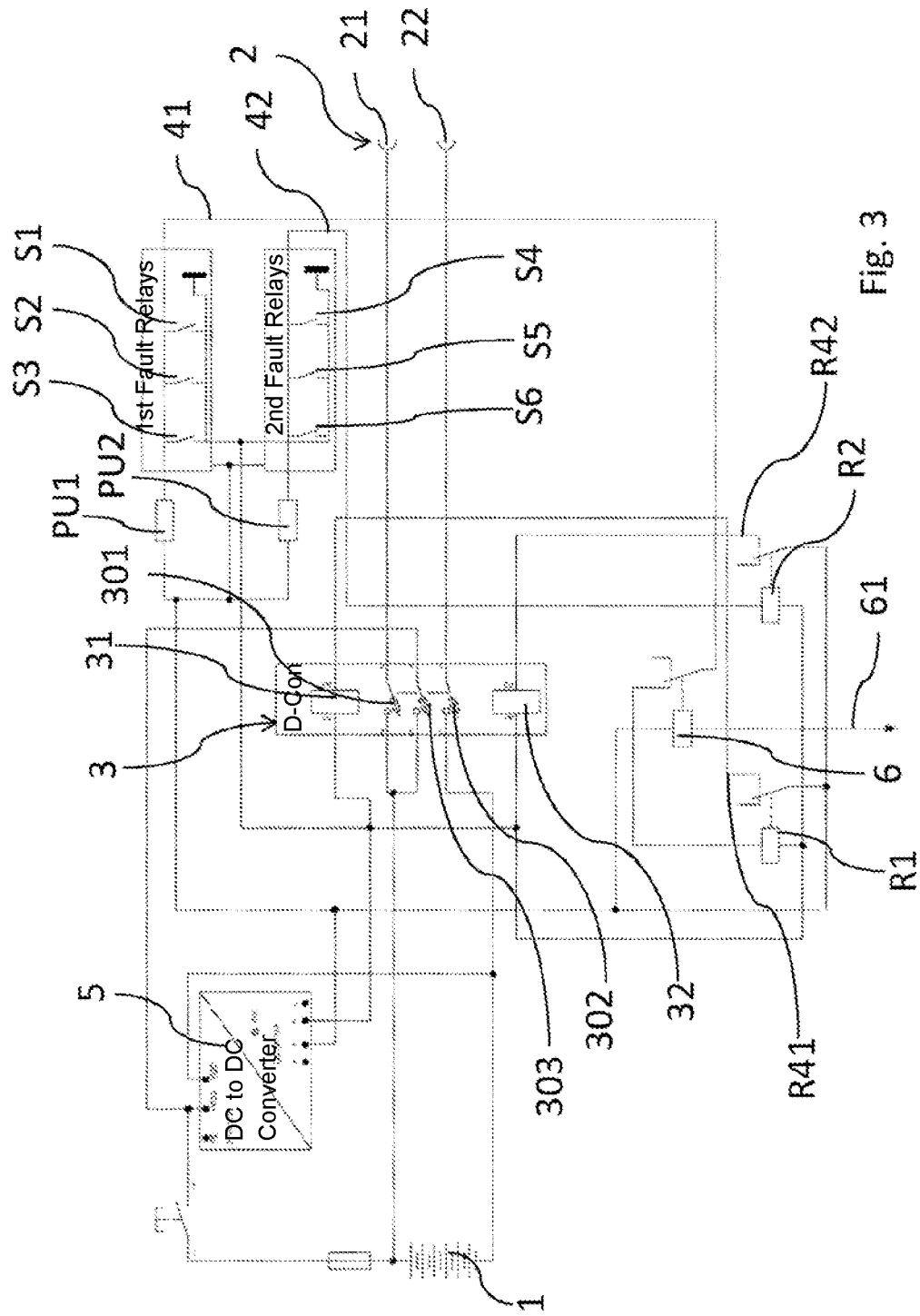
FIG. 3 shows a circuit diagram of a battery system in accordance with a third embodiment.

FIG. 3 shows a circuit diagram of a battery systems in accordance with a third embodiment. The latter differs from the battery system in accordance with the second embodiment illustrated in FIG. 2 in terms of the arrangement and functioning of the first fault relays S1, S2, S3 and the second fault relays S4, S5, S6. While the first fault relays S1, S2, S3 in the embodiment in accordance with FIG. 2 were connected in series one after another in the first signal circuit 41 and a fault state and a resultant opening of one of the first fault relays S1, S2, S3 led to an opening of the first signal circuit 41, the first fault relays S1, S2, S3 in the embodiment in accordance with FIG. 3 are arranged in parallel with one another between the first signal circuit 41 and ground. In this case, a fault state leads to a resultant closing of one of the first fault relays S1, S2, S3. This in turn results in the first signal circuit 41 being pulled to ground and the current flow through the first relay R1 thus being interrupted. For this purpose, a first pull-up resistor PU1 is arranged between the positive pole of the first signal circuit 41 and the first fault relays S1, S2, S3.

This functioning is also provided in the second signal circuit 42 and is realized with a second pull-up resistor PU2 and three second fault relays S4, S5, S6 arranged in parallel with one another, one or a plurality thereof being closed in the event of a fault state of the battery module 1 in order to pull the second signal circuit 42 to ground. The current flow through the second relay R2 is interrupted as a result.

It should be noted that the functioning of the circuit necessitates converting a pull-up/pull-down signal generated by one or a plurality of the fault relays S1, S2, S3, S4, S5, S6 into a relay signal. The circuitry details for realizing this using hardware-components are sufficiently known to a person skilled in the art and will therefore not be explained more specifically here.

LIST OF REFERENCE SIGNS

PU1 first pull-up resistor
PU2 second pull-up resistor
R1 first relay
R2 second relay
R41 first auxiliary circuit
R42 second auxiliary circuit
S1 first fault relay
S2 further first fault relay
S3 further first fault relay
S4 second fault relay
S5 further second fault relay
S6 further second fault relay
1 battery module
2 output terminal
21 pole
22 pole
3 Disconnector
301 first switch
302 second switch
303 third switch
31 first holding coil
32 second holding coil
41 first signal circuit
42 second signal circuit
5 DC/DC converter
6 control relay
61 control terminal

The invention claimed is:

1. A battery system, in particular for use in a local electrical grid, the battery system comprising:
   at least one battery module;
   an output terminal electrically connected to the battery module and serving for charging and/or discharging the battery module from and/or into the local electrical grid;
   a disconnector arranged between the battery module and at least one pole of the output terminal and configured to, in an open state, disconnect the electrical connection between the battery module and the at least one pole of the output terminal;
   a first signal circuit configured to, in the event of a fault state identified by the battery module, bring about triggering of the disconnector in such a way as to interrupt the electrical connection between the battery module and the at least one pole of the output terminal; and a second signal circuit configured to, in the event of a fault state identified by the battery module, bring about triggering of the disconnector in such a way that the electrical connection between the battery module and the at least one pole of the output terminal is interrupted, wherein the disconnector comprises a first holding coil, which is supplied with current by the first signal circuit, and a second holding coil, which is supplied with current by the second signal circuit, wherein the holding coils are configured to hold the disconnector in a closed state, if they are both simultaneously supplied with current.

2. The battery system as claimed in claim 1, wherein the first signal circuit comprises a first fault relay, which is controlled by the battery module and which, in the event of the fault state identified by the battery module, is opened in order thereby to open the first signal circuit, or is closed in order thereby to bring the first signal circuit to a predefined potential.

3. The battery system as claimed in claim 1, wherein the second signal circuit comprises a second fault relay, which is controlled by the battery module and which, in the event of the fault state identified by the battery module is opened in order thereby to open the second signal circuit, or is closed in order thereby to bring the second signal circuit to a predefined potential.

4. The battery system as claimed in claim 2, wherein one or a plurality of further battery modules are provided, wherein the first signal circuit comprises one or a plurality of further first fault relays controlled by the battery module and/or wherein the second signal circuit comprises one or a plurality of further second fault relays controlled by the battery module.

5. The battery system as claimed in claim 1, wherein the disconnector is configured at least in two-pole fashion with a first switch and a second switch in such a way as, in an open state, to disconnect the electrical connection between the battery module and two poles of the output terminal.

6. The battery system as claimed in claim 5, wherein the disconnector is configured in three-pole fashion with a third switch, which, in a closed state of the disconnector, ensures a current supply for the first signal circuit and/or the second signal circuit and, in the opened state of the disconnector, interrupts the current supply for the first signal circuit and/or the second signal circuit.

7. The battery system as claimed in claim 1, wherein the disconnector is configured in single-pole fashion with a first switch or in multi-pole fashion with at least a second switch and/or a third switch, and in that each switch has an electrical fuse.

8. The battery system as claimed in claim 1, wherein the disconnector is configured in single-pole fashion with a first switch or in multi-pole fashion with at least a second switch and/or a third switch, wherein all switches are mechanically coupled to one another in such a way that they can change between the open state and a closed state of the disconnector only jointly.

9. The battery system as claimed in claim 1, wherein the disconnector comprises an actuation element, by means of which the disconnector is able to be transferred manually from the open state to the closed state.

10. The battery system as claimed in claim 1, wherein the first signal circuit and/or the second signal circuit are/is fed from the battery module.

11. A local electrical grid comprising a battery system as claimed in claim 1 and an inverter connected to the output terminal.

12. A multi-pole disconnector comprising:
a first switch and at least a second switch and/or a third switch for disconnecting a battery module from at least one pole of an output terminal, wherein all switches are mechanically coupled to one another in such a way that they can change between the open state and a closed state of the disconnector only jointly, and
at least a first holding coil and a second holding coil, which are configured to hold the switches in a closed state only if the first holding coil and the second holding coil are both simultaneously supplied with current,
wherein the first holding coil is configured to be supplied with current by a first signal circuit and the second holding coil is configured to be supplied with current by a second signal circuit.

13. The multi-pole disconnector as claimed in claim 12, wherein the switches comprise an actuation element in which the switches of the actuation element are able jointly to be transferred manually from the open state to the closed state.

* * * * *